Jan. 19, 1932.　　　J. CHODUR　　　1,841,788
FLYING MACHINE
Filed March 26, 1931　　2 Sheets-Sheet 2

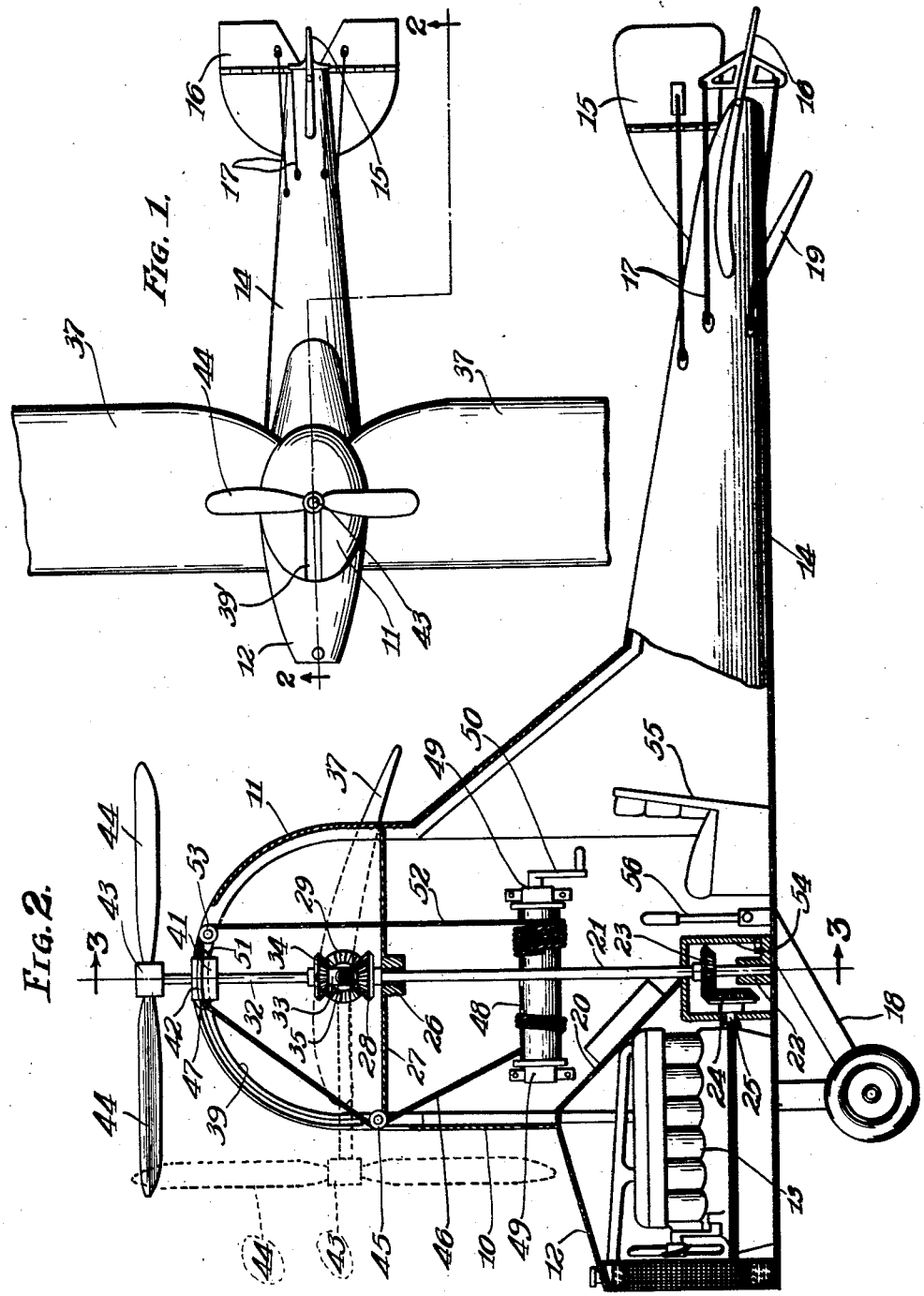

INVENTOR
J. Chodur
BY
ATTORNEY.

Patented Jan. 19, 1932

1,841,788

UNITED STATES PATENT OFFICE

JOHN CHODUR, OF CHICAGO, ILLINOIS, ASSIGNOR OF ONE-HALF TO MICHAEL KOPER, OF CHICAGO, ILLINOIS

FLYING MACHINE

Application filed March 26, 1931. Serial No. 525,384.

The present invention relates to flying machines and has for its main object the provision of a machine wherein the propeller shaft may be angularly shifted for the purpose of impeding the fall of the machine in the event of an accident or mishap.

A further object of the present invention is the provision of a flying machine, including the operator's housing, wherein the tail may extend from one end of said housing and the motor may extend from the opposite end thereof, with means for angularly shifting the propeller shaft from its normal horizontal position to its vertical position for the purpose of impeding the fall of the machine in the event of an accident or mishap, and wherein the fall of the machine would not result in a spin due to the fact that the tail portion and motor housing are equally balanced at each end of the operator's housing.

With the above general objects in view and others that will appear as the nature of the invention is better understood the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Figure 1 is a top plane view of the present invention;

Figure 2 is an enlarged side view of the flying machine, partly in section and partly in elevation;

Figure 3:
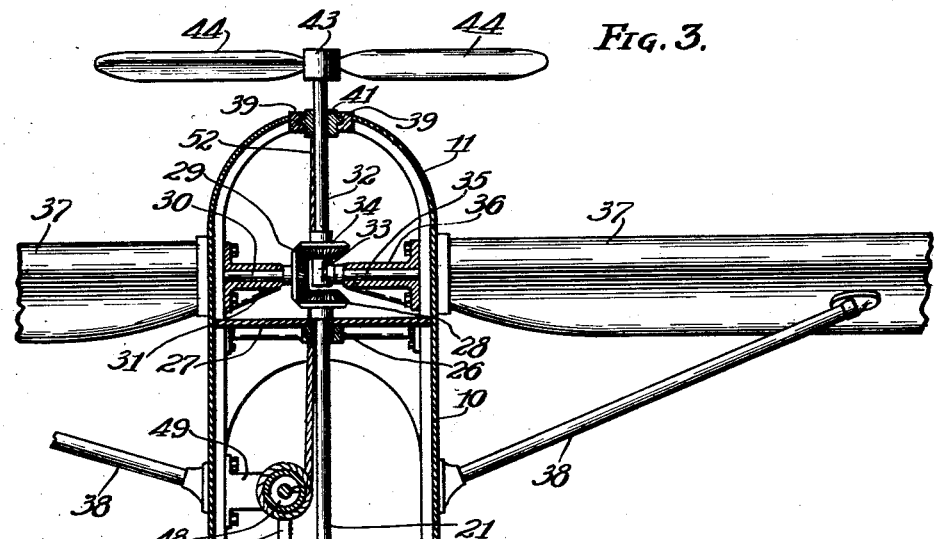
Figure 3 is a transverse cross-sectional view through the flying machine, the view having been taken on line 3—3 of Figure 2.
Figure 4:
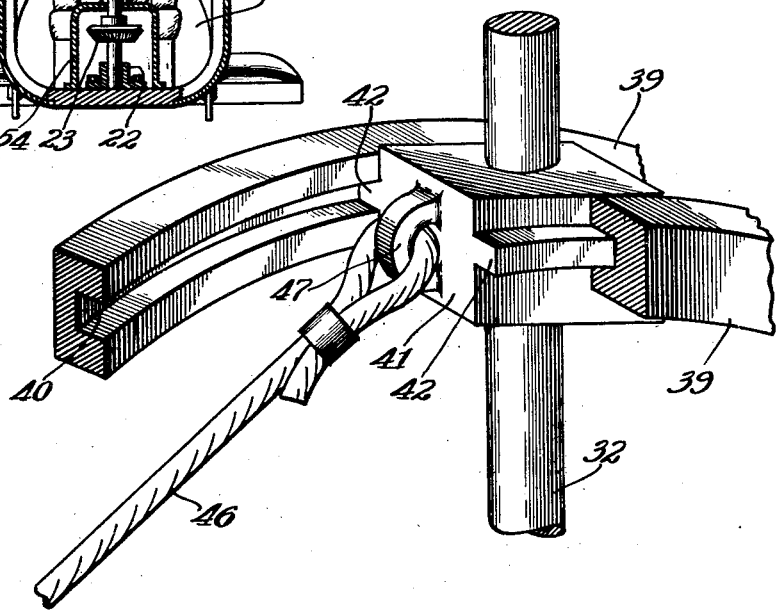
Figure 4 is an enlarged perspective view of one of the bearings for the propeller shaft, with the guiding rails, wherein said bearing is adopted for shifting movement.

Referring in detail to the present drawings there is shown therein the operator's housing or cabin 10 which is substantially oval-shaped on horizontal cross-sectional plane, said cabin 10 at its upper portion being provided with dome roof 11. Extending forwardly of said cabin 10, and at the lower end thereof is housing 12, wherein the usual motor 13 is positioned. From the opposite end of said cabin 10 the remaining portion of fuselage, including tail 14, extends. Said tail portion 14 is provided with the usual rudder 15 and tail planes 16, operable by means of cables 17, which pass through said tail portion 14 of the fuselage to the operator's cabin 10, wherein the same may be operated by the operator. Beneath the forward end of the flying machine is conventional carriage 18, and at the tail portion is landing gear 19.

Rearwardly of motor 13 is instrument-board 20, which, if desired, may be hingedly connected to the side of cabin 10 for providing access to the motor from within said cabin 10.

Substantially centrally of cabin 10 vertical shaft 21 is positioned, its lower end resting within bearing 22. A short distance above said bearing 22 said shaft 21 has a bevel gear 23 rigidly positioned thereupon, said gear 23 meshing with a similar bevel gear 24, the latter being positioned upon shaft 25, the latter shaft being rotated and driven by motor 13.

The upper end of vertical shaft 21 passes through bearing 26 which is positioned substantially centrally of ceiling 27, which separates cabin 10 from dome roof 11, and is provided above said ceiling 27 with bevel gear 28. Said latter shaft 25 meshes with bevel gear 29, which remains in angular position with respect to said gear 28. Said gear 29 is rigidly attached at one end of stub shaft 30 which is set for rotary movement within bearing 31 which is rigidly affixed to side of cabin 10 within its roof portion 11.

The lower end of propeller shaft 32 is set within L-shaped bearing 33 and is provided above said bearing with a rigidly affixed gear 34 which meshes with gear 29. The horizontal portion of said L-shaped bearing 33 is adapted to rigidly engage the outer end of stub shaft 35, which latter shaft rests for rotary movement within bearing 36, said latter bearing being rigidly affixed to the opposite side of the cabin 10 within its roof portion 11.

Substantially on the same plane with bearings 31 and 36 are usual sustaining planes 37 rigidly affixed by their inner ends to the cabin 10 and laterally thereof at its dome portion 11. Braces 38 are provided at the sides of cabin 10 for supporting said sustaining planes 37.

Co-extensively with the length of the flying machine the dome portion 11 of the cabin 10, and at its forward end is provided with spaced guiding rails 39, with slot 39' resulting therefrom, each of which is provided with longitudinal groove 40, the grooves of said rails facing each other. Positioned between said guiding rails 39 is a block bearing 41, which is provided with lateral, integrally formed lugs 42 which are positioned within grooves 40. Positioned within said block bearing 41 and adapted for rotation therewithin, is said propeller shaft 32 the outer end of said propeller shaft 32 has mounted thereupon propeller head 43 with blades 44.

Mounted within the lower end of said slot 39', and substantially on the plane with ceiling 27 is pulley 45 over which cable 46 is adapted to pass. One end of said cable 46 is affixed to ear 47 integrally formed at one of the free ends of block bearing 41, while the opposite end of said cable 46 is rigidly affixed to the windlass drum 48, said windlass drum being supported at its ends by brackets 49 which are mounted within and at one side of cabin 10. One end of said windlass drum 48 is provided with crank 50 for rotating the same.

The opposite free end of block bearing 41 is provided with similar ear 51 at which one end of cable 52 is engaged, said cable 52 passing over pulley 53 and mounted within dome 11 and adjacent the upper termination of slot 39'. The opposite end of cable 52 is affixed to the opposite end of windlass drum 48.

The adjacent ends of shafts 21 and 25, and their respective gears 23 and 24 are enclosed within casing 54 which may be filled with oil. A similar casing, not shown, may be provided for the series of upper gears.

From the hereinabove description it will be apparent that the rotation of shaft 25 is transmitted to shaft 21, through respective gears 24 and 23. The rotation of gear 21 is transmitted to propeller shaft 32 through the medium of gears 28, 29 and 34.

It will also be apparent that by virtue of the construction hereinabove described propeller shaft 32 may be angularly shifted from its normal horizontal position illustrated by dotted lines on Figure 2, to the vertical position shown by full lines on Figure 2. This is accomplished by rotating windlass drum 48 by means of crank 50. It is observed that the ends of cables 46 and 52 which are affixed to said windlass drum 48 are wound around said drum 48 each in opposite direction. Thus, when the drum is rotated in one direction, cable 52 will be wound upon said drum, simultaneously unwinding cable 46, which action will bring about pulling by cable 52 upon block bearing 41, simultaneously releasing pulley 46 from its action upon said block bearing 41. This action of cable 52 will bring the block bearing 41 to assume the position within the upper termination of slot 39' causing the assumption of vertical position by propeller shaft 43.

Conversely when the windlass drum 48 is operated in the opposite direction, cable 52 will become released and will unwind itself from said drum, while simultaneously cable 52 will wind upon drum 48, exerting pulling force upon block bearing 41 to bring the same to the lower termination of slot 39'. This action of pulley 42 will cause shaft 32 to assume horizontal normal position illustrated by dotted lines on Figure 2, which position of said shaft and of the propeller adapts the flying machine for normal flying movement. To maintain said shaft 32 in its either horizontal or vertical position locking means may be provided at the windlass drum 48 for maintaining the same in its chosen position and preventing the same from accidental rotation.

When propeller shaft 32 is shifted from its either horizontal or vertical position, its lower end at all times remains within the upright portion of L-shaped bearing 33. Stub shaft 35, which has affixed thereto the horizontal portion of said bearing, prevents the displacement of said L-shaped bearing 33, but allows the shifting thereof in unison with the shifting of shaft 32. During the shifting of shaft 32 its gear 34 bodily shifts as is obvious.

Positioned upon the floor of the flying machine and substantially at the rear end of cabin 10 is operator's seat 55 with lever 56 for operating cables 17.

While there is described herein a preferred embodiment of the present invention, it is nevertheless to be understood that minor changes may be made therein without departing from the spirit and scope of the invention as claimed.

What I claim as new is:

1. A flying machine comprising a cabin, a vertical shaft positioned substantially centrally of said cabin, means for imparting rotary movement to said shaft, a propeller shaft positioned at the upper end of said cabin, means for transmitting rotation to said vertical shaft to said propeller shaft, a pair of spaced guiding rails, each of said guiding rails being provided with facing grooves, a block bearing positioned within the slot resulting between said guiding rails, lugs laterally projecting from said block bearing, said lugs being adapted to enter said grooves in said guiding rails, said propeller shaft being adapted to pass through and rotate within said block bearing, ears provided at the two remaining sides of said block bearing, pulley mounted upon each side of said block bearing on a plane co-extensive with said slot, and a cable attached to each of said ears and passing over each of said pulleys for angularly shifting said propeller shaft.

2. A flying machine comprising a cabin, a vertical shaft positioned substantially centrally of said cabin, means at the lower end of said vertical shaft for imparting rotary movement thereto, a gear rigidly mounted at the upper end of said shaft, a bearing mounted at one side of said cabin, a horizontal stub shaft positioned within said bearing, a gear rigidly mounted upon the free end of said stub shaft, said gear meshing with the gear at the upper end of said vertical shaft, another bearing mounted at the opposite side of said cabin, another horizontal stub shaft mounted within said last named bearing, an L-shaped bearing rigidly mounted by its horizontal leg portion upon said last named stub shaft a propeller shaft mounted by its lower end within the vertical portion of said L-shaped bearing, a bevel gear mounted upon said propeller shaft adjacent its lower end, said gear meshing with the gear upon one of said stub shafts, and means for angularly shifting said propeller shaft.

3. A flying machine comprising a cabin, a vertical shaft positioned substantially centrally of said cabin, means at the lower end of said vertical shaft for imparting rotary movement thereto, a gear rigidly mounted at the upper end of said shaft, a bearing mounted at one side of said cabin, a horizontal stub shaft positioned within said bearing, a gear rigidly mounted upon the free end of said stub shaft, said gear meshing with the gear at the upper end of said vertical shaft, another bearing mounted at the opposite side of said cabin, another horizontal stub shaft mounted within said last named bearing, an L-shaped bearing rigidly mounted by its horizontal leg portion upon said last named stub shaft, a propeller shaft mounted by its lower end within the vertical portion of said L-shaped bearing, a bevel gear mounted upon said propeller shaft adjacent its lower end, said gear meshing with the gear upon one of said stub shafts, a pair of spaced guiding rails at the upper end of said cabin, a block bearing positioned between said guiding rails, the upper end of said propeller shaft passing through said block bearing, and means for shifting said block bearing within said guiding rails.

4. A flying machine comprising a cabin, a shaft positioned within said cabin, means at one end of said shaft for imparting a rotary movement thereto, a gear rigidly mounted at the other end of said shaft, a pair of bearings mounted within said cabin, a stub shaft positioned within each of said bearings, said stub shafts being in longitudinal alinement, a gear rigidly mounted upon the free end of one of said stub shafts, a propeller shaft, a gear upon said propeller shaft, said first mentioned gear and said gear upon said propeller shaft each meshing with said gear upon said stub shaft, an L-shaped bearing rigidly mounted by its horizontal leg portion upon the other of said stub shafts, one end of said propeller shaft mounted by one of its ends within the vertical portion of said L-shaped bearing, and means for angularly shifting said propeller shaft.

In testimony whereof I affix my signature.
JOHN CHODUR.